(12) United States Patent
Vishnu Vardhan

(10) Patent No.: US 11,055,880 B2
(45) Date of Patent: Jul. 6, 2021

(54) GENERATIVE SYSTEM AND METHOD FOR CREATING FASHION PRODUCTS

(71) Applicant: Myntra Designs Private Limited, Bangalore (IN)

(72) Inventor: Makkapati Vishnu Vardhan, Karnataka (IN)

(73) Assignee: Myntra Designs Private Limited, Bangalore (IN)

( * ) Notice: Subject to any disclaimer, the term of this patent is extended or adjusted under 35 U.S.C. 154(b) by 139 days.

(21) Appl. No.: 16/266,973

(22) Filed: Feb. 4, 2019

(65) Prior Publication Data

US 2019/0347831 A1 Nov. 14, 2019

(30) Foreign Application Priority Data

May 8, 2018 (IN) .............................. 201841017205

(51) Int. Cl.
| | |
|---|---|
| *G06T 11/00* | (2006.01) |
| *G06F 17/16* | (2006.01) |
| *G06F 16/583* | (2019.01) |
| *G06N 3/04* | (2006.01) |

(52) U.S. Cl.
CPC ............ *G06T 11/00* (2013.01); *G06F 16/583* (2019.01); *G06F 17/16* (2013.01); *G06N 3/0454* (2013.01)

(58) Field of Classification Search
CPC ........ G06T 11/001; G06T 2207/20081; G06N 3/0454; G06F 30/27
See application file for complete search history.

(56) References Cited

U.S. PATENT DOCUMENTS

| | | | |
|---|---|---|---|
| 2018/0374249 A1* | 12/2018 | Colbert | ................ G06K 9/4628 |
| 2019/0251612 A1* | 8/2019 | Fang | ........................ G06N 3/08 |
| 2019/0259175 A1* | 8/2019 | Inoue | ........................ G06N 3/08 |

* cited by examiner

*Primary Examiner* — Antonio A Caschera
(74) *Attorney, Agent, or Firm* — BakerHostetler

(57) ABSTRACT

A generative system includes a memory having computer readable instructions stored therein. The system further includes a processor configured to access a plurality of fashion images of a plurality of fashion products. The processor is configured to train a generative model using the plurality of fashion images of the fashion products. The processor is further configured to estimate latent vectors corresponding to the plurality of fashion images via the generative model. Furthermore, the processor is configured to transform the latent vectors to generate one or more transformed fashion images via the generative model. The one or more transformed fashion images are generated using characteristics of the plurality of fashion images. Moreover, the processor further configured to create one or more fashion products based upon the generated transformed fashion images.

17 Claims, 5 Drawing Sheets

GENERATIVE SYSTEM AND METHOD FOR CREATING FASHION PRODUCTS

PRIORITY STATEMENT

The present application claims priority under 35 U.S.C. § 119 to Indian patent application number 201841017205 filed 8 May 2018, the entire contents of which are hereby incorporated herein by reference.

BACKGROUND

The invention relates generally to generative systems and methods for creation of fashion products and more particularly to a system and method for generating fashion images of fashion products inspired by input designs.

A variety of e-commerce websites offer fashion products suitable for customers with varied fashion interests. Fast fashion is an area of fashion design where designers generate new designs that are inspired by trending or top selling fashion products. In some cases, the designers generate new designs that include certain design elements of input designs but may be distinctly different from them. However, the generated designs are dependent on the individual designers and the process is substantially subjective and not repeatable.

Some designers use image reconstruction techniques to generate new designs and such designs may be displayed on e-commerce websites. Most of the current image reconstruction techniques generate images using one or more images from similar domains. However, the generated image may have distortions due to pixel level loss, and it may be difficult to generate reconstructed images of a desired quality.

Thus, there is a need to provide a system that can generate realistic images of fashion products while being objective in design generation.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a generative system for creating fashion products.

Briefly, according to an example embodiment, a generative system for creating fashion products is provided. The generative system includes a memory having computer-readable instructions stored therein. The generative system further includes a processor configured to access a plurality of fashion images of a plurality of fashion products. The processor is configured to train a generative model using the plurality of fashion images of the fashion products. The processor is further configured to estimate latent vectors corresponding to the plurality of fashion images via the generative model. Moreover, the processor is further configured to transform the latent vectors to generate one or more transformed fashion images via the generative model. The one or more transformed fashion images are generated using characteristics of the plurality of fashion images create one or more fashion products are created based upon the generated transformed fashion images.

According to another example embodiment, a generative system for creating fashion products is provided. The generative system includes a memory having computer-readable instructions stored therein. The generative system further includes a processor configured to: access a plurality of fashion images of a plurality of fashion products. The processor is configured to train a generative model using the plurality of fashion images of the fashion products. The generative model includes at least one of generative adversarial network (GAN) and a variational auto encoder (VAE). The processor is further configured to estimate latent vectors corresponding to the plurality of fashion images via the generative model. In addition, a generator of the GAN or an encoder of the VAE is configured to estimate the latent vectors. Moreover, the processor is configured to transform the latent vectors to generate one or more transformed fashion images via the generative model. The one or more transformed fashion images are generated based upon characteristics of the plurality of fashion images and one or more fashion products are created based upon the generated transformed fashion images.

According to another example embodiment, a method for creating fashion products is provided. The method includes accessing a plurality of fashion images of a plurality of fashion products and training a generative model using the plurality of fashion images of the fashion products. The method further includes estimating latent vectors corresponding to the plurality of fashion images via the generative model. The latent vectors are interpolated to generate one or more transformed fashion images via the generative model. The one or more transformed fashion images are generated using characteristics of the plurality of fashion images. The method also includes creating one or more fashion products based upon the generated transformed fashion images.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
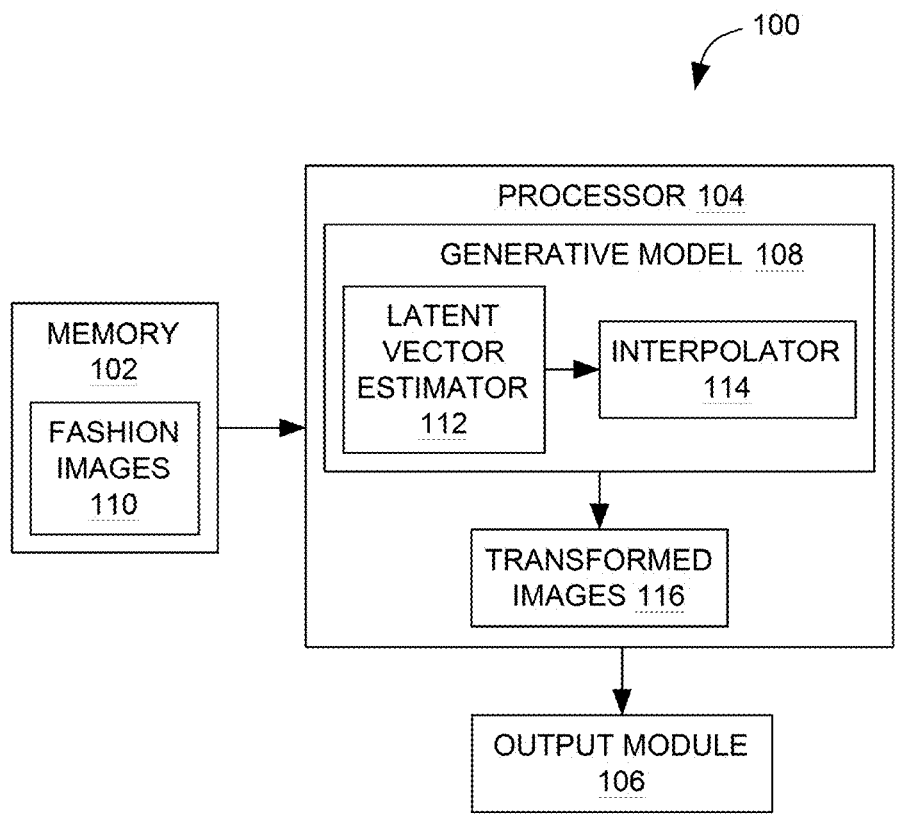
FIG. 1 illustrates a block diagram illustrating a generative system for creating fashion products, according to an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a generative system for creating fashion products such as available for sale on an e-commerce platform. The generative system may be configured to create fashion products inspired by a plurality of input designs using generative models such as described below.

FIG. 1 is a block diagram illustrating a generative system 100 for creating fashion products. The generative system 100 includes a memory 102, a processor 104 and an output module 106. Each component is described in further detail below.

As illustrated, the processor 104 is communicatively coupled to the memory 102 and is configured to access fashion images such as represented by reference numeral 110 of a plurality of fashion products stored in the memory 102. The fashion images 110 may be images of fashion products purchased by a plurality of users via an e-commerce fashion platform. The fashion images 110 may include images of a top wear, a bottom wear, footwear, bags, or combinations thereof. In one example, the fashion images 110 may include images of top selling fashion products from the e-commerce platform.

In this embodiment, the processor 104 includes a generative model 108. The processor 104 is configured to train the generative model 108 using the plurality of fashion images 110. In an embodiment, the generative model 108 may include at least one of a generative adversarial network (GAN) or a variational auto encoder (VAE). However other generative models may be envisaged.

The generative model 108 further includes a latent vector estimator 112 and an interpolator 114. In operation, latent vector estimator 112 is configured to estimate latent vectors using the plurality of fashion images 110. In an embodiment, the latent vector estimator 112 is configured to estimate the latent vectors using a loss function that will be described below.

The interpolator 114 is configured to transform the latent vectors to generate one or more transformed fashion images 116 of the fashion products. The one or more transformed fashion images 116 are generated using characteristics of the plurality of fashion images 110.

In an example, the processor 104 is configured to train a generative adversarial network (GAN) to generate fashion images from latent vectors using the plurality of fashion images. The GAN may include a generator and a discriminator. Here, the fashion images may be generated by achieving equilibrium between the generator and the discriminator. In this embodiment, the generated fashion images 116 may be compared with the original fashion images 110 and the latent vectors may be updated using gradient descent until the generated fashion images 116 are substantially similar to the original fashion images 110.

In another example, the processor is configured to train a variational auto encoder (VAE) to generate fashion images from latent vectors using the plurality of fashion images. In this embodiment, a decoder of the VAE is configured to transform the latent vectors to generate fashion images.

In an example, the interpolator 114 is configured to interpolate the latent vectors and to generate the transformed fashion images corresponding to the interpolated latent vectors.

Here, the transformed fashion images may have substantially similar design elements, color, structure, edges, or combinations thereof, as of the respective original fashion images. In an embodiment, the processor 104 is configured to compare the generated fashion images 116 with original fashion images 110. Further the latent vectors may be updated using gradient descent until the generated fashion images are substantially similar to the original fashion images of the fashion products.

In one embodiment, the interpolator 114 is configured to interpolate the latent vectors and generate the transformed fashion images 116 corresponding to the interpolated latent vector. In this example the interpolator 114 is configured to interpolate the latent vectors using a bilinear interpolation, linear interpolation, bicubic interpolation, or combinations thereof. As will be appreciated by one skilled in the art, a variety of other interpolation techniques may be envisaged. In one example, the interpolator 114 is configured to estimate the interpolated latent vector (z) in accordance with the relationship:

$$z=(1-d_x)(1-d_y)z_1+(1-d_x)(d_y)z_2+(d_x)(1-d_y)z_3+(d_x)(d_y)z_4 \quad (1)$$

where z is the interpolated latent vector;
- $z_1$ is the first latent vector estimated from first fashion image;
- $z_2$ is the second latent vector estimated from second fashion image;
- $z_3$ is the third latent vector estimated from third fashion image;
- $z_4$ is the fourth latent vector estimated from fourth fashion image; and
- $d_x$ and $d_y$ are the weights for the interpolation.

In this example, the interpolator 114 is configured to select the weights (such as $d_x$ and $d_y$) for interpolation based upon a type of the fashion product, visual attributes of the fashion product, or combinations thereof. Here the weights may be used to determine the fashion images that will influence the generated fashion image more and may be chosen appropriately by the user of the generative system 100.

In some examples, the processor 104 is configured to generate the fashion images 116 that have substantially similar design elements, color, structure, edges, or combinations thereof as of the respective original fashion images 110. The processor 104 is further configured to create one or more fashion products upon the generated fashion images of the fashion products 116. The fashion products along with the generated fashion images 116 may be displayed, to a user of the generative system 100 via the output module 106.

Figure 2:
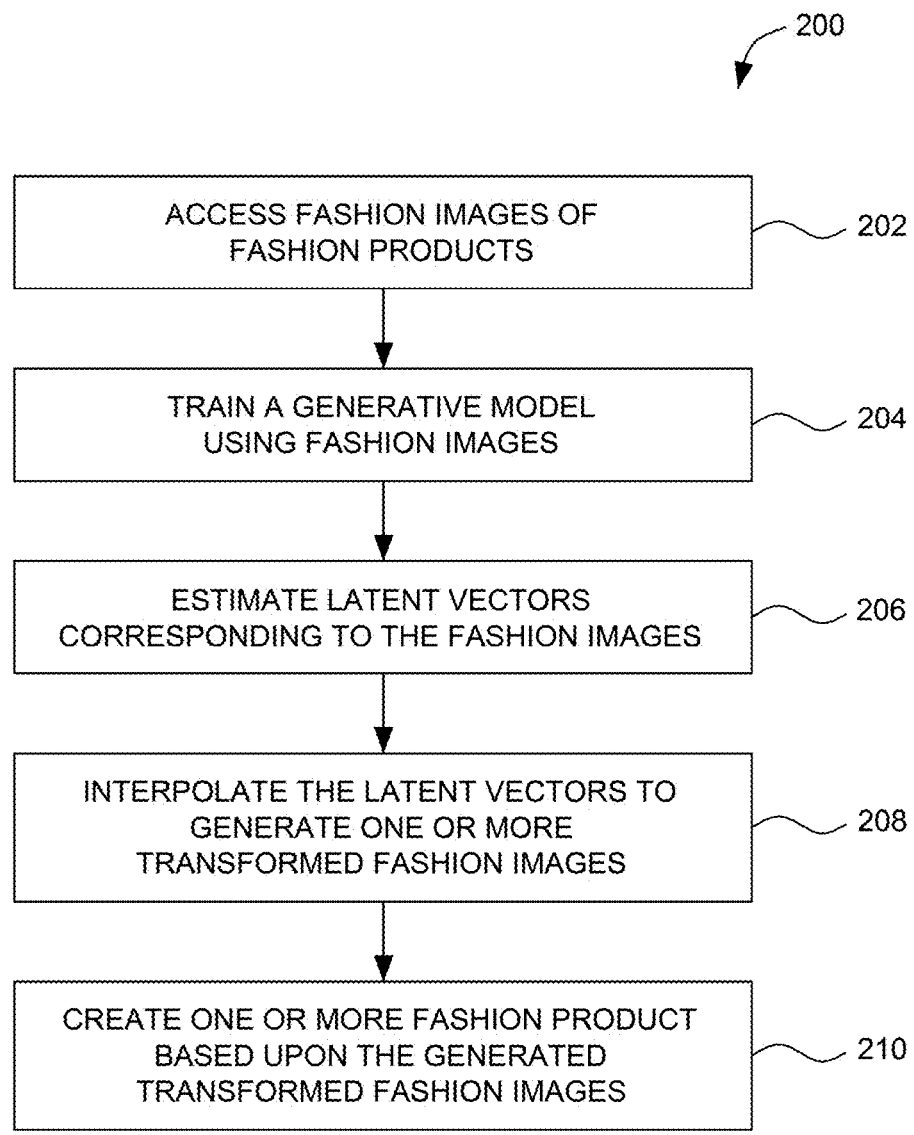
FIG. 2 is an example process for creating fashion products, using the system of FIG. 1, according to the aspects of the present technique.

FIG. 2 is an example process 200 for creating fashion products, using the system 100 of FIG. 1, according to the aspects of the present technique.

At step 202, a plurality of fashion images of a plurality of fashion products purchased by a plurality of users via an e-commerce fashion platform are accessed. The fashion products may include a top wear, a bottom wear, footwear, bags or combinations thereof. The fashion images may be accessed from a memory device configured to store the fashion images.

At step 204, a generative model is trained using the plurality of the fashion images of the fashion products. In an example, the generative model may include a generative adversial network (GAN) that may be trained to generate fashion images from latent vectors using the plurality of fashion images. In another example, the generative model may include a variational auto encoder (VAE) that may be trained to generate the fashion images from latent vectors using the plurality of fashion images.

At step 206, latent vectors corresponding to the plurality of fashion images are estimated, via the generative model. In an embodiment, the latent vector estimated using a loss function.

At step 208, the latent vectors are interpolated to generate one or more transformed fashion images via the generative model. In this example, the one or more transformed fashion images may be generated using characteristics of the plurality of fashion images. For example, the one or more transformed fashion images are generated to have substantially similar design elements, color, structure, edges, or combinations thereof as of the respective original fashion images. Further, at step 210, one or more fashion products are created based upon the generated transformed fashion images.

Figure 3:
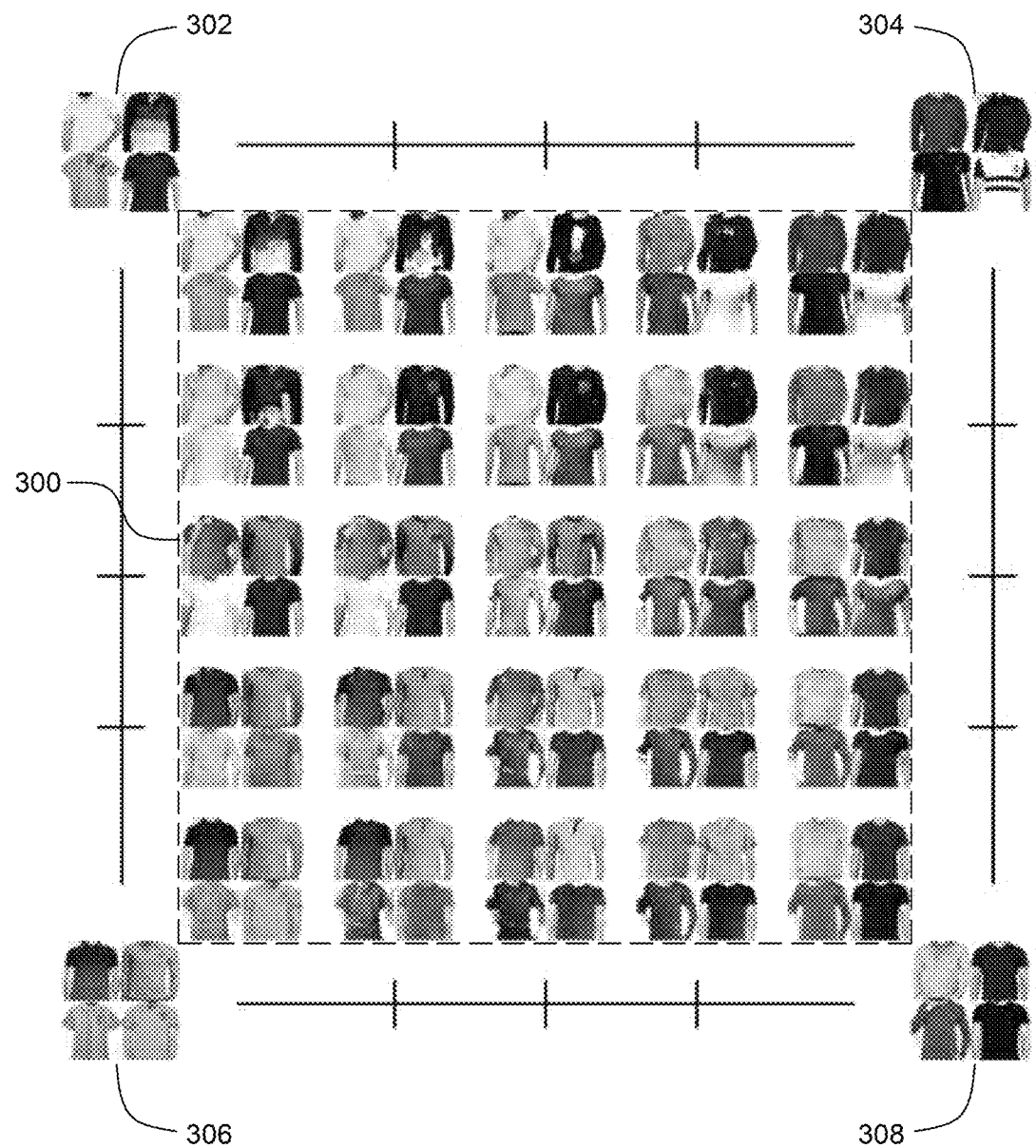
FIG. 3 is an example illustration of generated transformed fashion images from a set of four original images of fashion products, using the system 100 of FIG. 1.

FIG. 3 is an example illustration of fashion images 300 generated using a set of four input images of fashion products, using the generative system 100 of FIG. 1. In this illustrated embodiment, the original input images are generally represented by reference numeral 302, 304, 306 and 308.

As can be seen, the input images 302, 304, 306 and 308 are images of top wear that may be available for sale using an e-commerce website. In the illustrated embodiment, the generative system 100 uses these input images 302, 304, 306 and 308 generating a plurality of transformed fashion images generally represented by reference numeral 300.

In this embodiment, the input images 302, 304, 306 and 308 may be used to train the generative model 108 such as a GAN or VAE of the generative system 100. Further, the generative model 108 may be used to estimate latent vectors to generate the transformed fashion images 300.

As described with reference to FIG. 1, the estimator 112 is configured to estimate latent vectors z1, z2, z3 and z4, from the original images such as 302, 304, 306 and 308 respectively. Here, the latent vectors z1, z2, z3 and z4 are estimated using the loss function. Furthermore, the interpolator 114 is configured to interpolate the latent vectors z1, z2, z3 and z4, and generate the transformed fashion images 300 corresponding to the interpolated latent vectors. In this embodiment, the interpolator 114 is configured to interpolate the latent vectors z1, z2, z3 and z4, using a bilinear interpolation, linear interpolation, bicubic interpolation, or combinations thereof.

In this embodiment, the interpolator 114 is configured to estimate the interpolated latent vector (z) in accordance with the relationship:

$$z=(1-d_x)(1-d_y)z_1+(1-d_x)(d_y)z_2+(d_x)(1-d_y)z_3+(d_x)(d_y)z_4 \quad (1)$$

where z is the interpolated latent vector;
- $z_1$ is the first latent vector estimated from first fashion image;

$z_2$ is the second latent vector estimated from second fashion image;

$z_3$ is the third latent vector estimated from third fashion image;

$z_4$ is the fourth latent vector estimated from fourth fashion image; and $d_x$ and $d_y$ are the weights for the interpolation.

The interpolated latent vector (z) may be used to generate the transformed fashion images 300. In some examples, the weights for the interpolation $d_x$ and $d_y$ may be selected based on the number of input images and the design characteristics of the input images 302, 304, 306 and 308. In one example, the weights for the interpolation $d_x$ and $d_y$ may be in range of 0 to about 1. As will be appreciated by one skilled in the art, the number of input images shown here are for illustrative purposes only. Fewer or larger number of input images may be used by the generative system 100.

Figure 4:
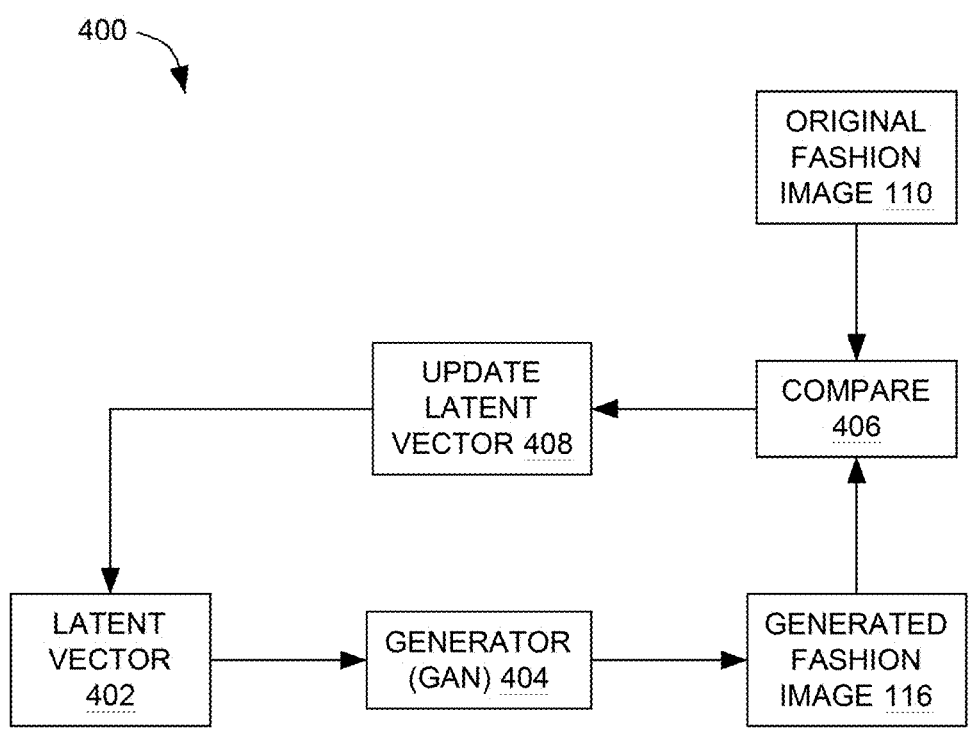
FIG. 4 is an example illustration of a process for estimating latent vectors using the generative system 100 of FIG. 1.

FIG. 4 is an example illustration of a process 400 for estimating latent vectors using the generative system 100 of FIG. 1.

As described above with reference to FIG. 1, the latent vector estimator 112 is configured to estimate latent vectors such as represented by reference numeral 402, using the plurality of fashion images such as represented by reference numeral 110. The latent vector 402 may be a random latent vector. At block 404, the latent vector is utilized to generate a fashion image such as represented by reference numeral 116 via the generative model (GAN) 108 such as using a generator 404 of the GAN 108. At block 406, the generated fashion image 116 is compared with the original fashion image 110. In this embodiment, a discriminator of the GAN 404 is configured to compare the generated fashion image 116 with the original fashion image 110 and to estimate a gradient descent value based on the difference between the generated and original fashion image 116 and 110 respectively.

At block 408, the latent vector is updated using the estimated gradient descent. The gradient descent is used to iteratively update the latent vector until the generated fashion image 116 is substantially similar to the original image 110. Here, gradient descent is used to update the latent vector 402 by determining a discriminator loss on comparing the original image 110 and the generated image 116. In certain embodiments, the latent vector 402 is updated using mean squared error (MSE) between the original image and the generated image.

As described before, the generator and discriminator of the GAN 404 are trained in an adversarial fashion to reach equilibrium in which generated fashion image 116 is substantially similar to the original fashion image 110. In this example, the latent vector 402 is updated in accordance with the following relationship:

$$z_{t+1} = z_t - \lambda * \text{Loss}_t \quad (2)$$

where $z_t$ is the latent vector at time t;

$z_{t+1}$ is the latent vector estimated at time t+1;

$\text{Loss}_t$ is loss function; and $\lambda$ is the learning rate

As described above, the latent vector 402 is updated using a loss function. In one example, the loss function is estimated by minimizing the error between the original image 110 and the corresponding generated image 116 and maximizing the detail/signal in the generated image 116. Here, the loss function may be estimated using a variety of techniques such as sum of modified Laplacian (SML), Laplacian, Energy Laplacian (EL), Tanenbaum Gradient (TG), or combinations thereof.

In some examples, the loss functions may be estimated in accordance with the following relationships:

$$L_{L1} = |G(\hat{z}) - C| \quad (3)$$

$$L_{L2} = \|G(\hat{z}) - C\|^2 \quad (4)$$

$$L_{SNR} = \frac{\|G(\hat{z}) - C\|^2}{\|G(\hat{z})\|^2} \quad (5)$$

$$L_{MSE/SML} = \frac{\|G(\hat{z}) - C\|^2}{|(\partial^2 G(\hat{z})/\partial x^2) + (\partial^2 G(\hat{z})\partial y^2)|} \quad (6)$$

$$L_{MSE/EL} = \frac{\|G(\hat{z}) - C\|^2}{|\partial^2 G(\hat{z})\partial x^2 + \partial^2 G(\hat{z})\partial y^2|} \quad (7)$$

$$L_{MSE/TG} = \frac{\|G(\hat{z}) - C\|^2}{\|Sx \sim G(\hat{z})\|^2 + |Sy \sim G(\hat{z})\|^2} \quad (8)$$

where C represents the original fashion image;

$\hat{z}$ is the latent vector;

$G(\hat{z})$ represents the generated fashion image; and

Sx and Sy are 3×3 sobel operators.

In certain examples, the fashion images generated using the techniques described are substantially similar to the original fashion images with certain enhanced features depending upon the techniques used to estimate the latent vectors. The generated images may be used to create new fashion products.

Figure 5:
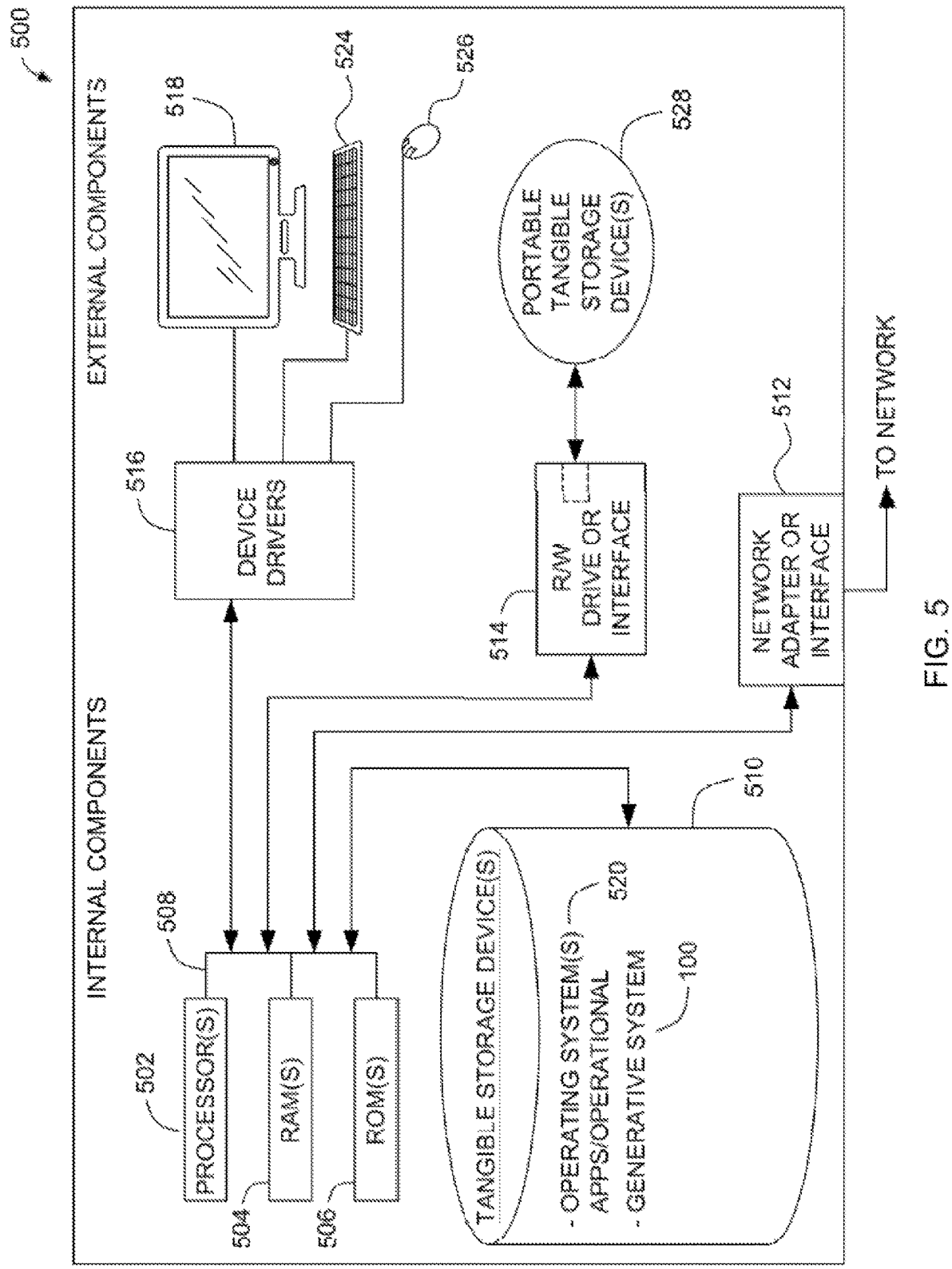
FIG. 5 is a block diagram of an embodiment of a computing device in which the modules of the generative system for creating fashion products, described herein, are implemented.

The modules of the generative system 100 for creating fashion products described herein are implemented in computing devices. One example of a computing device 500 is described below in FIG. 5. The computing device includes one or more processor 502, one or more computer-readable RAMs 504 and one or more computer-readable ROMs 506 on one or more buses 508. Further, computing device 500 includes a tangible storage device 510 that may be used to execute operating systems 520 and the generative system 100. The various modules of the generative system 100 include a processor 104, a memory 102 and an output module 106. The processor 104 further includes a generative model 108. Both, the operating system 520 and the generative system 100 are executed by processor 502 via one or more respective RAMs 504 (which typically includes cache memory). The execution of the operating system 520 and/or the system 100 by the processor 502, configures the processor 502 as a special purpose processor configured to carry out the functionalities of the operation system 520 and/or the generative system 100, as described above.

Examples of storage devices 510 include semiconductor storage devices such as ROM 506, EPROM, flash memory or any other computer-readable tangible storage device that may store a computer program and digital information.

Computing device also includes a R/W drive or interface 514 to read from and write to one or more portable computer-readable tangible storage devices 528 such as a CD-ROM, DVD, memory stick or semiconductor storage device. Further, network adapters or interfaces 512 such as a TCP/IP adapter cards, wireless Wi-Fi interface cards, or 3G or 4G wireless interface cards or other wired or wireless communication links are also included in computing device.

In one example embodiment, the generative system 100 which includes a processor 104, a memory 102 and an output module 106, may be stored in tangible storage device 510 and may be downloaded from an external computer via a network (for example, the Internet, a local area network or other, wide area network) and network adapter or interface 512.

Computing device further includes device drivers 516 to interface with input and output devices. The input and output devices may include a computer display monitor 518, a keyboard 524, a keypad, a touch screen, a computer mouse 526, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A generative system for creating fashion products, the system comprising:
    a memory having computer-readable instructions stored therein; and
    a processor configured to:
        access a plurality of fashion images of a plurality of fashion products;
        train a generative model using the plurality of fashion images of the fashion products;
        estimate latent vectors corresponding to the plurality of fashion images via the generative model;
        bilinearly interpolate latent vectors in accordance with the relationship:

$$z=(1-d_x)(1-d_y)z_1+(1-d_x)(d_y)z_2+(d_x)(1-d_y)z_3+(d_x)(d_y)z_4,$$

z being the interpolated latent vector, $z_1$ being the first latent vector estimated from first fashion image, $z_2$ being the second latent vector estimated from second fashion image, $z_3$ being the third latent vector estimated from third fashion image, $z_4$ being the fourth latent vector estimated from fourth fashion image, and $d_x$ and $d_y$ being the weights for the interpolation;
        transform the latent vectors to generate one or more transformed fashion images via the generative model, wherein the one or more transformed fashion images are (i) generated using characteristics of the plurality of fashion images and (ii) generated corresponding to the interpolated latent vectors; and
    create one or more fashion products based upon the generated transformed fashion images.

2. The generative system of claim 1, wherein the processor is further configured to execute the computer-readable instructions to train the generative models using images of top selling fashion products from an e-commerce platform.

3. The generative system of claim 1, wherein the processor is further configured to execute the computer-readable instructions to train a generative adversarial network (GAN) to generate fashion images from latent vectors using the plurality of fashion images, wherein the GAN comprises a generator and a discriminator.

4. The generative system of claim 1, wherein the processor is further configured to execute the computer-readable instructions to generate the fashion images by achieving an equilibrium between discriminative models and the generative models.

5. The generative system of claim 4, wherein the processor is further configured to execute the computer-readable instructions to:
    compare the generated fashion images with original fashion images; and
    update the latent vectors using gradient descent until the generated fashion images are similar to the original fashion images.

6. The generative system of claim 1, wherein the processor is further configured to execute the computer-readable instructions to train a variational auto encoder (VAE) to generate fashion images from latent vectors using the plurality of fashion images, wherein a decoder of the VAE is configured to transform the latent vectors to generate fashion images.

7. The generative system of claim 1, wherein the processor is further configured to execute the computer-readable instructions to select the weights for interpolation based upon a type of the fashion product, visual attributes of the fashion product, or combinations thereof.

8. The generative system of claim 1, wherein the processor is further configured to execute the computer-readable instructions to access a plurality of fashion images of a top wear, a bottom wear, foot wear, bags, or combinations thereof.

9. The generative system of claim 1, wherein the processor is further configured to execute the computer-readable instructions to generate transformed fashion images of the fashion products, wherein the transformed fashion images have similar design elements, color, structure, edges, or combinations thereof as of the respective original fashion images.

10. The generative system of claim 1, wherein the processor is further configured to execute the computer-readable instructions to:
    estimate the latent vectors using a loss function;
    minimize an error between the original image and the generated image; and
    maximize a detail or signal in the generated image.

11. A generative system for creating fashion products, the system comprising:
    a memory having computer-readable instructions stored therein; and
    a processor configured to:
        access a plurality of fashion images of a plurality of fashion products;
        train a generative model using the plurality of fashion images of the fashion products; wherein the generative model comprises at least one of generative adversarial network (GAN) and a variational auto encoder (VAE);
        estimate latent vectors corresponding to the plurality of fashion images via the generative model, wherein a generator of the GAN or an encoder of the VAE is configured to estimate the latent vectors;
        bilinearly interpolate latent vectors in accordance with the relationship:
        $$z=(1-d_x)(1-d_y)z_1+(1-d_x)(d_y)z_2+(d_x)(1-d_y)z_3+(d_x)(d_y)z_4,$$
        z being the interpolated latent vector, $z_1$ being the first latent vector estimated from first fashion image, $z_2$ being the second latent vector estimated from second fashion image, $z_3$ being the third latent vector estimated from third fashion image, $z_4$ being the fourth latent vector estimated from fourth fashion image, and $d_x$ and $d_y$ being the weights for the interpolation;
        transform the latent vectors to generate one or more transformed fashion images via the generative model, wherein the one or more transformed fashion images are (i) generated based upon characteristics of the plurality of fashion images and (ii) generated corresponding to the interpolated latent vectors; and
        create one or more fashion products based upon the generated transformed fashion images.

12. The generative system of claim 11, wherein the transformed fashion images are generated similar to original fashion images of the one or more fashion products.

13. The generative system of claim 12, wherein the processor is further configured to execute the computer-readable instructions to update the latent vectors using gradient descent until the generated fashion images are similar to original fashion images of the fashion products.

14. The generative system of claim 11, wherein the processor is further configured to execute the computer-readable instructions to access a plurality of fashion images of a top wear, a bottom wear, foot wear, bags, or combinations thereof.

15. A method for creating fashion products, the method comprising:
    accessing, via a processor, a plurality of fashion images of a plurality of fashion products;
    training, via a processor, a generative model using the plurality of fashion images of the fashion products;
    estimating, via a processor, latent vectors corresponding to the plurality of fashion images via the generative model;
    bilinearly interpolating, via a processor, latent vectors in accordance with the relationship:
    $$z=(1-d_x)(1-d_y)z_1+(1-d_x)(d_y)z_2+(d_x)(1-d_y)z_3+(d_x)(d_y)z_4,$$
    z being the interpolated latent vector, $z_1$ being the first latent vector estimated from first fashion image, $z_2$ being the second latent vector estimated from second fashion image, $z_3$ being the third latent vector estimated from third fashion image, $z_4$ being the fourth latent vector estimated from fourth fashion image, and $d_x$ and $d_y$ being the weights for the interpolation;
    wherein one or more transformed fashion images are (i) generated using characteristics of the plurality of fashion images and (ii) generated corresponding to the interpolated latent vectors; and
    creating, via a processor, one or more fashion products based upon the generated transformed fashion images.

16. The method of claim 15, wherein training the generative model comprises training a generative adversarial network (GAN) to generate fashion images from latent vectors using the plurality of fashion images.

17. The method of claim 15, wherein training the generative model comprises training a variational auto encoder (VAE) to generate fashion images from latent vectors using the plurality of fashion images.

* * * * *